J. T. Butler,
Cotton Bale Tie.
No. 26,087.                    Patented Nov. 15, 1859
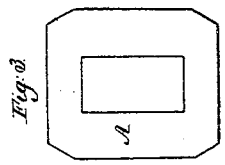
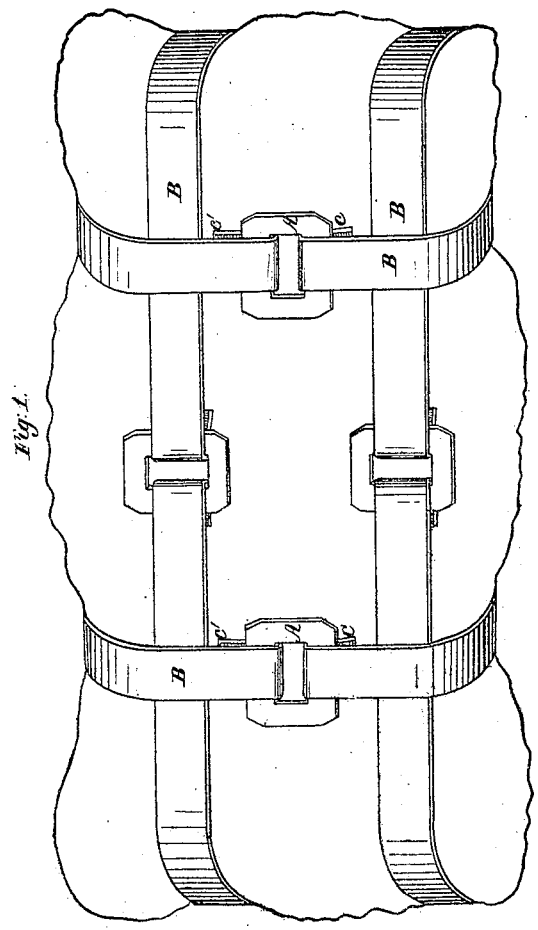

UNITED STATES PATENT OFFICE.

JOHN T. BUTLER, OF NATCHEZ, MISSISSIPPI.

IMPROVEMENT IN FASTENING METAL HOOPS ON COTTON-BALES.

Specification forming part of Letters Patent No. 26,087, dated November 15, 1859.

*To all whom it may concern:*

Be it known that I, JOHN T. BUTLER, of Natchez, in the county of Adams and State of Mississippi, have invented a new and Improved Fastening of Iron Hoops for Bales of Cotton and for other Similar Purposes; and I hereby declare that the following is a full and exact description.

The nature of the invention consists in the particular mode of arranging the clasp-hooks with respect to the buckle-frame and the cotton to be encircled by the hoops.

There has been great difficulty hitherto, since the adoption of iron hoops for the purpose of baling cotton, in finding a good and faultless mode of fastening the bands. Many devices have been proposed and some patented; but all have objections. Some are good so long as the bale has fair and gentle usage; but with the rough usage to which they are liable they unhook or break. Others are complex and are not easily applied, and, besides, are expensive.

My devices are simple, cheap, and cannot unlock except by breaking the hoop or band itself. The only expense attending the device used herein is in cutting out of the rectangular buckle-frame from a piece of iron hoop a little broader than that used for the band that is to encircle the bale. Into this frame each end of the band, bent into a hook, is passed from the outside, so that the lap of the hook in each case shall be folded back between the band and the bale of cotton, or the covering thereof.

In the accompanying drawings, which make part of this specification, Figure 1 represents a bale of cotton covered and mounted with the iron bands and buckle and hooks referred to. Fig. 2 represents an edge view of the buckle and hooks and parts of band. Fig. 3 represents a separate view of the buckle-frame.

Let A represent the buckle-frame, which is a square or rectangular piece of thick hoop-iron with the corners clipped and a rectangular slot, $a$, cut in its middle, the longest way of the slot being in the direction crossing the band.

Let B represent the band, and C C' the hooks, one of which hooks, C, being bent, after being received through the slot from the outside, so as to fold upon itself of a sufficient length between the band and the covering of the bale so as to be firmly attached to the buckle-frame, while the hook C' is opened a little wider at its extremity, to enable it to slip into the slot with greater ease. When the hook C' is received into the slot, the bale is still under pressure in the cotton-press, and it is comparatively easy to bend the fold of the hook after it is received between the bale and the band, so that it may be brought into contact with the latter. Each of the bands is fastened in substantially the same way, and while the bale is under the pressure of the cotton-press. The ends or folds of the band, received through the buckle-frame and folded upon themselves within, are retained in their position, as soon as the bale is released from the cotton-press, by the outward pressure of the bale against the hooks. It is this outward pressure of the bale, when released from the cotton-press, against the face of the hooks and buckle A, on which the point of my invention rests. Therefore

What I claim as my invention is—

The combination of the buckle-frame A, when made without any opening in the border of it, with the hooks C C', when the latter are received through the former and held in place by the pressure of the bale against them, substantially as described and represented.

JOHN T. BUTLER.

Witnesses:
 THOS. HENDERSON,
 G. F. SANDERSON.